United States Patent [19]

Teramachi

[11] 4,310,202
[45] Jan. 12, 1982

[54] LINEAR BALL BEARING UNIT AND METHOD FOR MANUFACTURING SAME

[76] Inventor: Hiroshi Teramachi, 2-34-8 Higashi-Tamagawa Setagaya-ku, Tokyo, Japan, 158

[21] Appl. No.: 137,489

[22] Filed: Apr. 4, 1980

[30] Foreign Application Priority Data

Apr. 28, 1979 [JP] Japan .................... 54-53245

[51] Int. Cl.³ .................................. F16C 29/06
[52] U.S. Cl. ....................... 308/6 C; 29/148.4 R; 29/149.5 R; 64/23.7
[58] Field of Search ............. 29/148.4 R, 148.4 B, 29/149.5 R; 64/23, 23.7; 308/3 R, 3 A, 6 R, 6 C

[56] References Cited

U.S. PATENT DOCUMENTS 4,127,309 11/1978 Teramachi ................. 308/6 C
4,253,709 3/1981 Teramachi ................. 308/6 C Primary Examiner—Frederick R. Schmidt
Attorney, Agent, or Firm—George B. Oujevolk

[57] ABSTRACT

A linear ball bearing unit made of a linear ball bearing and an elongated track shaft as well as a method for manufacturing the bearing unit. The linear ball bearing consists of balls, a half-split bearing case, which in turn is formed by splitting an elongated square bar presenting a plurality of guide grooves for the balls along diametrically opposing two grooves, and a half-split ball retainer also presenting a plurality of guide grooves of the balls. The elongated track shaft is assembled with said linear ball bearing. The line passing through a first point of contact between a loaded ball and its corresponding R-groove in the track shaft and a second point of contact between the same loaded ball and its corresponding R-groove in the bearing case meets a horizontal line at an acute angle. The line passing through a third point of contact between another R-groove in the track shaft and one of the balls in the same groove and a fourth point of contact between the same one of the balls and its corresponding R-groove in the bearing case meets a vertical line at an acute angle. Such angles impart strength, particularly against upward thrust.

6 Claims, 13 Drawing Figures

LINEAR BALL BEARING UNIT AND METHOD FOR MANUFACTURING SAME

BACKGROUND OF THE INVENTION

1. Field of the Invention

The present invention relates to a guide allowing mechanical linear motion, more particularly, to a linear ball bearing unit for guiding linear motion which unit develops less friction resistance against linear motion owing to the use of bearing.

In one aspect, this invention relates to a linear ball bearing unit made of a linear ball bearing and an elongated track shaft. The linear ball bearing consists of balls, a half-split bearing case, which in turn is formed by splitting an elongated square bar presenting a plurality of guide grooves for the balls along diametrically opposing two grooves, and a half-split ball retainer also presenting a plurality of guide grooves of the balls. The elongated track shaft is assembled with said linear ball bearing. The line passing through a first point of contact between a loaded ball and its corresponding R-groove in the track shaft and a second point of contact between the same loaded ball and its corresponding R-groove in the bearing case meets a horizontal line at an acute angle. The line passing through a third point of contact between another R-groove in the track shaft and one of the balls in the same groove and a fourth point of contact between the same one of the balls and its corresponding R-groove in the bearing case meets a vertical line at an acute angle. In another aspect, this invention relates to a method for manufacturing the above linear ball bearing unit.

2. Description of the Prior Art

The present inventor developed previously a bearing case for linear ball bearing capable of bearing heavy load. After forming guide grooves for balls in an elongated square bar, it was necessary to cut away both lower portions of the inner cylindrical wall in an upward and inward direction with respect to the central axis thereof to form a pair of axially extending recesses adapted for assembling a track shaft with the thus-formed bar. It was also required to thicken certain portions of the bar in order to reinforce the strength of such portions. However, such a thick wall may not be required where a bearing case is not subject to heavy load. Thus, the production method of the abovedescribed prior art is accompanied with drawback that the material would be wasted when a bearing case of a light-load rating is manufactured.

The inventor of the present invention has conducted an extensive research to solve the above drawback of the prior art method. As a result of the research, the present invention has been completed.

SUMMARY OF THE INVENTION

In one aspect of this invention, there is provided a linear ball bearing unit which comprises a half-split bearing case having a semi-circular inner wall in transverse cross-section, a half-split ball retainer and a track shaft. The bearing case is formed by forming a cylindrical inner wall centrally and longitudinally through an elongated square bar. Then a plurality of guide grooves for loaded balls and guide grooves for non-loaded balls are alternately formed in the inner surface of the cylindrical inner wall. Both of the grooves have a U-shaped groove wall in transverse cross-section. A circular groove, which is adapted for changing the rolling direction of balls, is then formed at each end portion of each of the grooves for loaded balls and its corresponding groove for non-loaded balls to define a ridge between said each of the grooves for loaded balls and its corresponding groove for non-loaded balls. The circular groove has a depth somewhat deeper than that of each of the guide grooves. The thus-formed bar is then split into halves along diametrically-opposing guide grooves for non-loaded balls. The ball retainer is formed by forming an endless raceway groove extending over each of the guide grooves for loaded balls and its corresponding guide groove for non-loaded balls. Then, a long slit is formed through the raceway groove in alignment with each of the guide grooves for loaded balls. A ridge is also formed in registration with each of the ridges of the case. The ball retainer is fit within the case and a number of balls are filled between the case and ball retainer to form a half-split endless sliding ball bearing. On the track shaft, are formed axially a plurality of shoulders in registration with a plurality of grooves defined by the loaded balls of said half-split endless sliding ball bearing. The track shaft is assembled with the half-split endless sliding ball bearing in such a manner that the line connecting a first point of contact between a loaded ball and the track shaft and a second point of contact between the same loaded ball and the case meets at a first acute angle with a line extending between said diametrically-opposing guide grooves for non-loaded balls as well as the line connecting a third point of contact between another loaded ball and the track shaft and a fourth point of contact between the same loaded ball and the case meets at a second acute angle with a line extending parpendicularly to the former line and passing through the center of the inner wall of the case.

In another aspect of this invention, there is also provided a novel method for manufacturing a linear ball bearing unit. The method comprises the following steps:

(a) a first step of forming a cylindrical inner wall axially and centrally through an elongated square bar;

(b) a second step of forming alternately and axially in the surface of said cylindrical inner wall a plurality of guide grooves for loaded balls and a plurality of guide grooves for non-loaded balls, both grooves having approximately U-shaped groove walls and being formed on a same circle, and said guide grooves for loaded balls having a width slightly greater than said guide grooves for non-loaded balls;

(c) a third step of forming at each end portion of said bar a circular groove which has a depth somewhat deeper than that of each of the guide grooves and connects each guide groove for loaded balls and its corresponding guide groove for non-loaded balls, thereby forming a ridge between said each guide groove for loaded balls and its corresponding guide groove for non-loaded balls;

(d) a fourth step of splitting said bar along the diametrically-opposing guide grooves for non-loaded balls to form two half-split bearing cases having an inner wall of a semi-circle in cross-section;

(e) a fifth step of forming in a steel pipe a plurality of endless raceway grooves upon assembling with one of said half-split bearing case, in alignment with said guide grooves for loaded and non-loaded balls of one of said half-split bearing cases, a long split through said steel pipe at a location in registration with each of said guide grooves for loaded balls and a ridge between grooves for guiding non-loaded balls;

(f) a sixth step of forming two half-split ball retainers by splitting the thus-formed steel pipe along the diametrically-opposing guide grooves for non-loaded balls; and (g) a seventh step of fitting one of said half-split ball retainer in one of said half-split bearing cases, filling the grooves of said one of said half-split ball retainers and said one of said half-split bearing cases with a number of balls to form an endless sliding ball bearing, and assembling a track shaft having a plurality of axially extending shoulders with said endless sliding ball bearing in such a manner that said shoulders fit in grooves defined by loaded balls and said one of said half-split ball retainers.

Brief Outline of the Problem

In a linear ball bearing which was previously developed by the inventor of the present invention and on which U.S. Pat. Nos. 3,938,854 and 4,040,679 have been granted, as shown in FIG. 8, the contact angle of a ball disposed in a side surface of the linear ball bearing is about 30° with respect to a horizontal line and that of a ball disposed in an upper surface of the linear ball bearing is approximately 40° with respect to the horizontal line. Supposing that the downward load exerted onto the loaded ball a is 2 Co. (because the loaded balls are disposed in two parallel raws), the leftward load and upward load would be respectively 0.8660 Co. and $0.5 \times Co. \times 2 = Co.$ Now supposing that the downward load is 1, then the leftward load and upward load are 0.4330 and 0.5 respectively.

However, linear ball bearings of this sort are not always employed in such a position that the load is exerted in a vertical direction only. As shown in FIG. 9, the bearing B is used in a vertical position together with a bearing case R. FIGS. 10(a) and 10(b) illustrate other use conditions of linear ball bearings. Namely, Bearings B, B, . . . are slidably moved back and forth on the track shafts R, R by means of the air cylinder A. The point of action S of the load W such as a drill unit D is located above the upper face of the bearing B as shown in FIG. 10(b) and the driving source of the drill unit is disposed below the upper face of the bearing B.

In each of FIGS. 10(a) and 10(b), a large upward load is applied to the bearings. Thus, it was necessary to use a bearing of a large size or two bearings B at a location where the large upward load is applied, in order to overcome the load.

The inventor has now solved this drawback of the prior art linear ball bearing units.

The inventor of this invention revealed that, in order to meet such a great upward load without enlarging the size of a bearing or employing two bearings, it is most desirous to form each of the contact angle of a ball disposed in a side surface of the bearing and the contact angle of a ball arranged in an upper surface of the bearing at 30° respectively with respect to a horizontal line and a vertical line.

More specifically, as shown in FIGS. 10(a) and 10(b), the points of contact on the R-grooves 59, 60 formed at both sides of each of the two raws of shoulders 55 of the track shaft 54 as well as the R-groove 23 formed in the halfsplit bearing case 10 are indicated respectively at m, n, m' and n'. According to one feature of the present invention, the angle of contact connecting n'-m'-o' is formed at about 30° with respect to a horizontal line, and the angle of contact of the upper loaded balls is also formed approximately at 30° with respect to a vertical line. Then, the downward load is 0.8660 Co.$\times 2 = 1.732$ Co. and the upward load is 0.5 Co$\times 2 =$ Co. On the other hand, the leftward load exerted on the loaded ball 22 in the upper surface of the bearing is 0.5 Co. The loaded ball 22 in the side face of the bearing is applied with a leftward load of 0.8660 Co.

Here, supposing the downward load being 1, there is provided a linear ball bearing unit in which the upward load will become 0.577 (about 60% of the downward load).

OBJECTS OF THE INVENTION

Therefore, an object of this invention is to provide a linear ball bearing unit which is high in productivity and accuracy and low in production cost. Such a bearing unit is manufactured by splitting an elongated square bar presenting a plurality of guide grooves for balls into halves to form two identical bearing cases, assembling with each of the thus-formed two bearing cases a half-split ball retainer presenting a plurality of guide grooves for balls via balls to form two identical linear ball bearings and then inserting an elongated track shaft into each of the bearings.

Still another object of this invention is to provide a linear ball bearing unit comprising a linear ball bearing made of a half-split bearing case presenting a plurality of guide grooves for balls and half-split ball retainer presenting a plurality of guide grooves for balls and assembled in the bearing case via balls, and a track shaft inserted in the linear ball bearing, in which unit the contact angle of balls disposed in a side face of the track shaft is formed at about 30° with respect to a horizontal line while the contact angle of loaded balls arranged in an upper face of the track shaft is formed approximately at 30°.

A further object of this invention is to provide a linear ball bearing unit comprising a linear ball bearing made of a half-split bearing case presenting a plurality of guide grooves for balls and a half-split ball retainer presenting a plurality of guide grooves for balls and assembled in the bearing case via balls, and a track shaft inserted in the linear ball bearing, in which the lower ends of said half-split ball retainer are in contact with their respective retainer holders which are fixedly secured to said half-split bearing case.

A still further object of this invention is to provide a linear ball bearing unit comprising a linear ball bearing made of a half-split bearing case presenting a plurality of guide grooves for balls and a half-split ball retainer presenting a plurality of guide grooves for balls and assembled in the bearing case via balls, and a track shaft inserted in the linear ball bearing, in which said half-split ball retainer is spaced from the track shaft.

A still further object of this invention is to provide such a linear ball bearing unit as described above, in which the half-split ball retainer is formed by virtue of an injection molding.

A still further object of this invention is to provide such a linear ball bearing unit as described above, in which each slit of the ball retainer is formed smaller than the diameter of each ball so as to prevent balls from falling down when the track shaft is pulled out of the linear ball bearing, thereby allowing extremely easy assembling, inspection and maintenance.

The invention as well as other objects and advantages thereof will become more apparent from the following detailed description when taken in conjunction with the accompanying drawings, in which:

DETAILED DESCRIPTION

Figure 7:
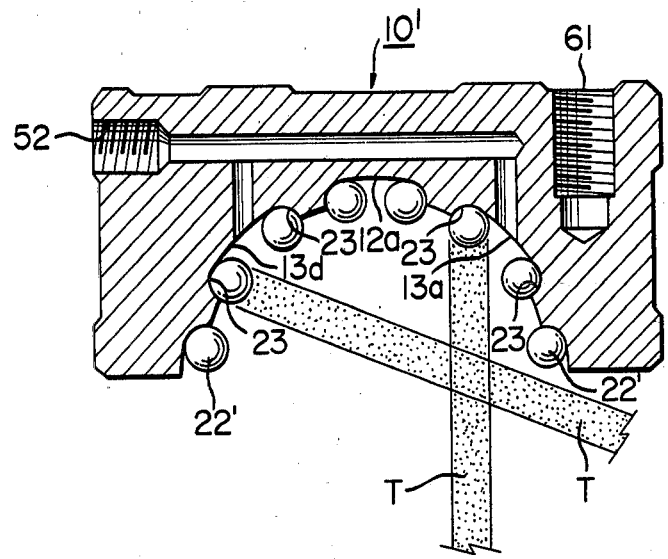
FIG. 7 is a transverse cross-sectional view, showing a manner of grinding and finishing R-grooves for balls in the inner wall of a half-split bearing case.
Figure 8:
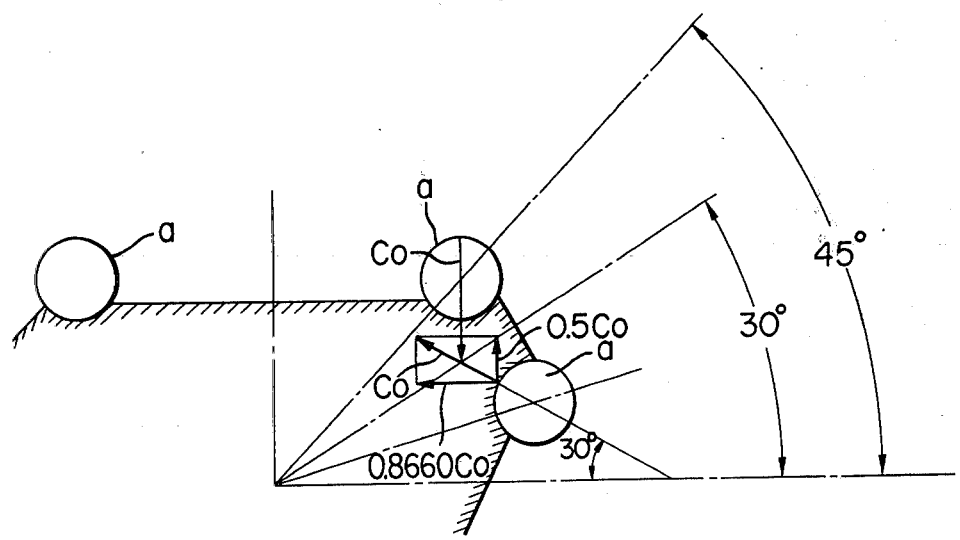
FIG. 8 is an explanatory illustration showing the action of loaded balls in a conventional bearing case.
Figure 9:
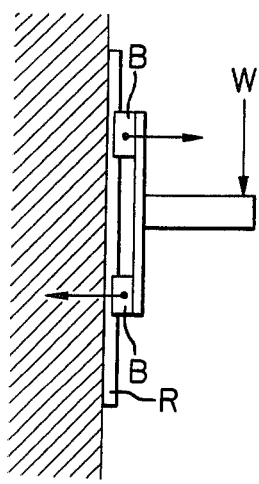
FIG. 9 is a schematic explanatory drawing in which the linear ball bearing unit is used in the vertical direction.
Figure 10A:
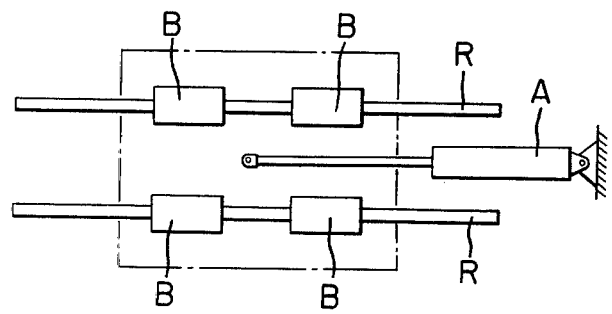
FIGS. 10(a) and 10(b) are schematic explanatory drawings in which the linear ball bearing unit is employed in the horizontal direction.
Figure 10B:
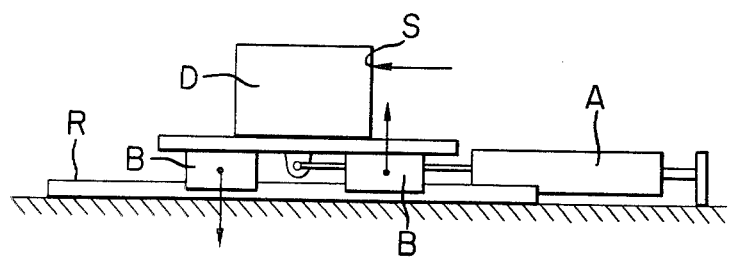
Figure 11A:
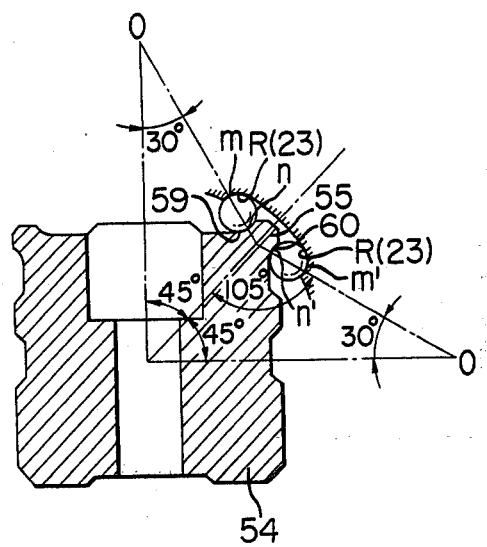
FIGS. 11(a) and 11(b) are explanatory illustrations, each showing the action of loaded balls disposed between an R groove of a half-split bearing case and the R-grooves formed at both sides of a shoulder of a track shaft.
Figure 11B:
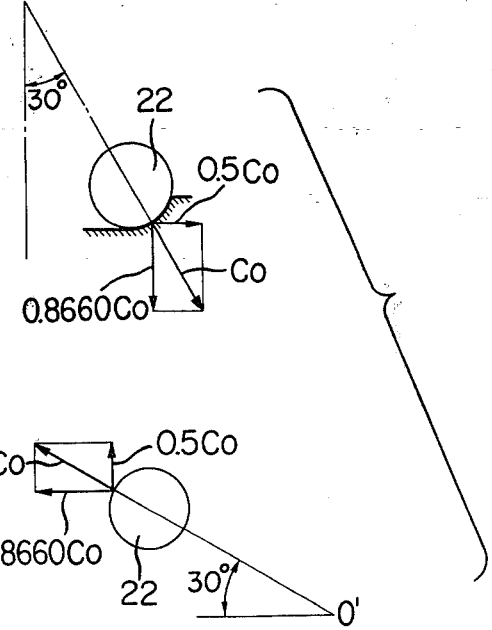

Designated at the numeral 10 is an elongated square bar having high strength and excellent wear reistance. The square bar 10 is cut into a predetermined length and a cylindrical inner wall 11 is formed axially through the bar 10. Guide grooves for non-loaded balls are indicated at the numerals 12a through 12d. Said grooves are defined in transverse cross-section by U-shaped groove walls and are spaced and opposed diametrically to each another. Designated at the numerals 13a through 13d are guide grooves for loaded balls, which grooves are disposed in transverse cross-section on the same circle as the above-described guide groove for non-loaded balls 12a through 12d and are disposed alternately with the latter grooves, thereby forming a plurality of ridges 14 to 21. In both side walls of each of the ridges, in other words, the ball guide grooves 12a to 12d and 13a to 13d, there are formed R-grooves, each of which has in transverse cross-section a curvature closely similar to that of each of the loaded balls 22 and non-loaded balls 22'. (See FIG. 7.)

At both end portions of the square bar 10, are formed circular grooves 24, 25 which are adapted to change the rolling direction of their respective balls. These circular grooves 24, 25 have the same transverse cross-sectional dimentions as the guide grooves without need for inclined steps as the guide grooves 12a through 12d for non-loaded balls and the guide grooves 13a through 13d have the same radius in transverse cross-section.

Figure 4:
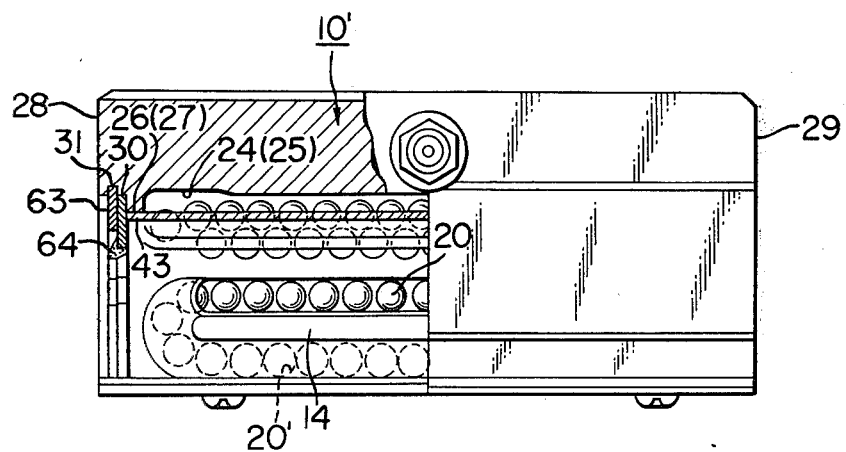
FIG. 4 is a longitudinal cross-sectional view of the bearing unit of FIG. 3, exclusive of the track shaft.

Bearings for ball retainers are respectively indicated at the numerals 26 and 27. The bearings are formed at their respective end faces 28 and 29 by forming the above-described circular grooves 24, 25 for changing the rolling direction of their respective balls. (See FIG. 4.) Indicated at the numerals 30 and 31 are respectively a side plate with a dust seal and a groove adapted for receiving a snap ring formed close to each of the end faces 28 and 29. (See FIG. 4.)

Figure 1:
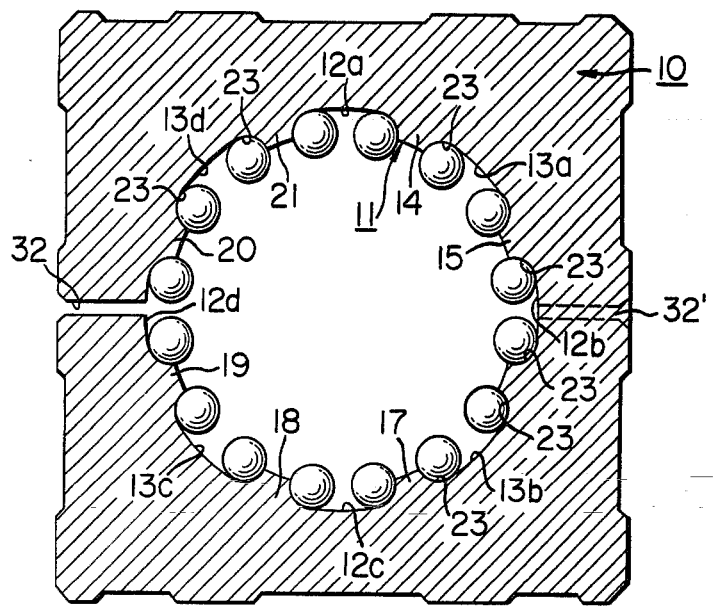
FIG. 1 is a cross-sectional view of an elongated hollow square bar having an inner cylindrical wall in which a plurality of ball guide grooves are formed, prior to splitting it into upper and lower halves which are bearing cases, each for a linear ball bearing unit according to one embodiment of the present invention.

Slits 32 and $32^1$ are formed by a cutting tool and the square bar 10 is split along a diameter thereof into two halves, i.e., half-split bearing cases $10^1$ and $10^2$ (See FIG. 1.)

Figure 2:
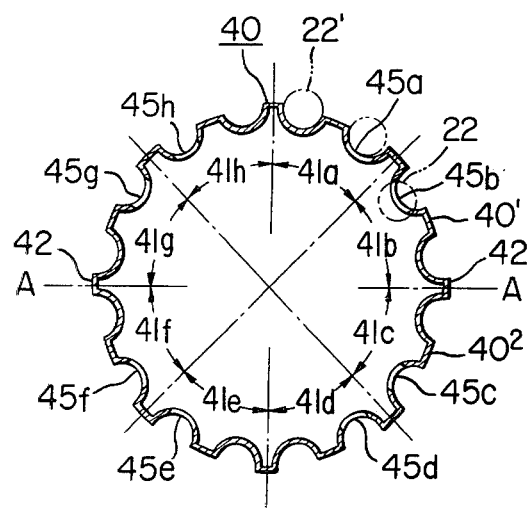
FIG. 2 is a cross-sectional view of unsplit ball retainer prior to being assembled into the linear ball bearing unit.

A ball retainer unit is indicated at the numeral 40 and consists of longitudinally extending portions 41a through 41h which are separated from each other by partition walls 42. Each of the longitudinally extending portions 41a through 41h for example portion 41a has a transverse width that it extends over its corresponding ridge 14, the guide groove 12a for non-loaded balls and the guide groove 13a for loaded balls. (See FIG. 2.)

The ball retainer unit 40 may be formed as follows. A thin-walled steel pipe having a diameter substantially equal to that of the cylindrical inner wall 11 of the square bar 10 is disposed between the male and female molds of a press. Said steel pipe is then subjected to a plastic deformation in several steps until the longitudinally extending portions 41a through 41h are formed with the partition walls 42 as well as protrusions are formed at both end portions. (See FIG. 4.)

Long slits 45a through 45h are windows formed through each of the longitudinally-extending portions 41a through 41h at locations corresponding to the guide grooves 13a through 13d, for loaded balls, of the square bar 10. The slits have a width of the order of preventing the loaded balls 22 from falling down therethrough, in other words, a width somewhat narrower than the diameter of the balls. (See FIG. 2.)

The ball retainer unit 40 are axially split by a cutting tool along the portions corresponding to the slits 32 and $32^1$, into two halves, i.e., half-split ball retainers $40^1$ and $40^2$.

Now, assembly procedure of a linear ball bearing according to the present invention is explained below.

The half-split ball retainer $40^1$ is disposed within the hollow space of the half-split bearing case $10^1$ in such a manner that the longitudinally-extending portions 41a, 41b, 41g and 41h of the retainer $10^1$ coincide the guide groove 12a for non-loaded balls as well as guide grooves 13a and 13d for loaded balls. Into the spacing formed between the half-split ball retainer $40^1$ and bearing case $10^1$ are filled a number of balls 22. The balls within each of the grooves 13a and 13d are aligned into two raws which define therebetween a trapezoidal space in transverse cross-section.

Figure 3:
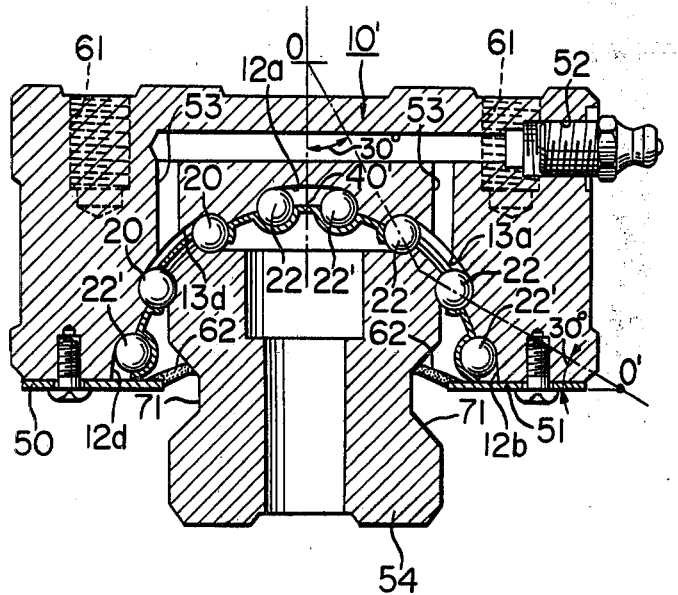
FIG. 3 is a transverse cross-sectional view of an assembled linear ball bearing unit according to the above embodiment of this invention.

Indicated at the numerals 50 and 51 are retainer holders fixedly secured on the lower faces of the half-split bearing case and support the both lower extremities of the half-split ball retainer $40^1$ fit in the half-split bearing case $10^1$. A grease supply hole 52 is formed through the bearing case $10^1$ and the inner end 53 of the hole opens into the guide grooves 13a and 13d, for loaded balls, of the half-split bearing case $10^1$. (See FIG. 3.)

Attachment holes, rubber lips, snap ring and side plate for a dust seal are indicated respectively at 61, 62, 63 and 64. The free end portion of each rubber lip 62 is bent in a direction away from the bearing case 10¹ so as to allow it to urge against the aslant surface of its respective groove 71 formed in the corresponding side wall of the track shaft 54, thereby avoiding the formation of any spacing.

Figure 5:
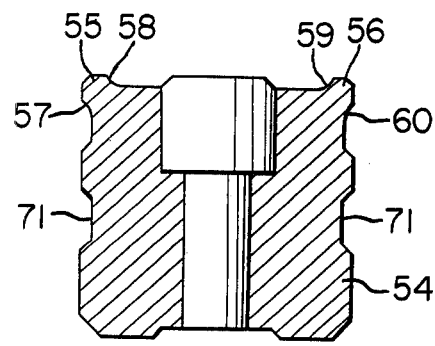
FIG. 5 is a transverse cross-sectional view of the track shaft.

The track shaft 54 is provided with shoulders 55 and 56 extending outwardly and upwardly from both upper corners of the track shaft 54. At both sides of each of the shoulders 55 and 56 are formed R grooves 57 to 60. (See FIG. 5.). Supposing that the points of contact between the R grooves 59 and 60 formed at both sides of the shoulder 56 and corresponding R grooves of the half-split bearing case 10¹ via respective balls are indicated by m, n, m' and n' respectively, a line connecting the points n' and m' meets at point o' with the horizontal line passing through the center of a hypothetical circle formed by the ball retainer 40¹ and its mirror image. Both lines meet at an angle of approximately 30°, which is preferable as it is strong against an upward thrust and it is also considered to receive sufficiently load of various directions which are expected to occur in view of the field in which a linear bearing is used.

The half-split bearing cases 10¹ and 10² can be made by dividing a standard square bar 10 into upper and lower or left and right sections. Since the open end of each of the half-split bearing cases 10¹ and 10² are wide, the R grooves 23 of the ball guide grooves 13a through 13d of the bearing case 10¹ can be ground and finished by a large grinder T. This not only improves the productivity of such half-split bearing cases but also enables to form ball guide grooves of high precision.

Figure 6:
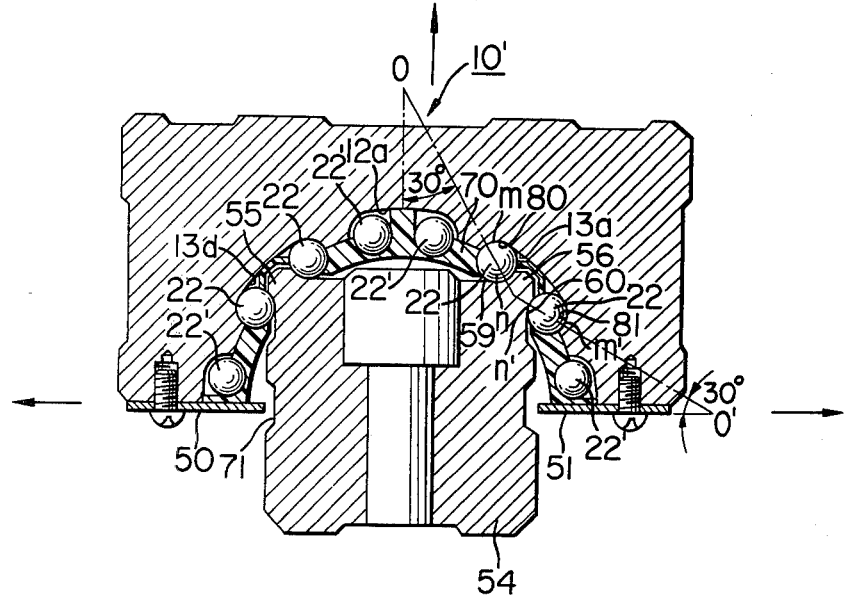
FIG. 6 is a transverse cross-sectional view of a linear ball bearing unit according to another embodiment of the present invention.

By the way, as shown in FIG. 6, it may be effective to make the half-split ball retainer 70 with a plastic material having high lubricating properties instead of steel.

In this case, the plastic ball retainer 70, which was molded by injection or the like is filled with loaded balls 22, 22 . . . and non-loaded balls 22', 22' . . . . The half-split bearing case 10' is then placed over the plastic ball retainer 70. The retainer holder 50 serves to prevent the retainer 70 from being displaced in the rolling direction while the snap ring 63 is effective to eliminate axial displacement of the same in conjunction with the side plate 30 provided with the dust seal. Upward displacement of the ball retainer 70 can also be prevented as it would contact with the inner wall of the bearing case 10¹ at the center of each of the guide groove 12a for non-loaded balls and guide grooves 13a and 13d for loaded balls. The plastic ball retainer 70 will not brought into contact with the outer peripheral surface of the track shaft 54 as there is formed a slight gap therebetween. The plastic ball retainer, which is fit within the half-split bearing case, has high lubricating property and serves as a noise-suppressor which is a typical property to plastics.

The present invention shall not be construed to be limited to the above embodiments but various modifications would be feasible without departing from the spirit of the present invention.

What is claimed is:

1. A linear ball bearing unit comprising a halfsplit bearing case having a semicircular inner wall in transverse cross-sections said case having been formed by forming a cylindrical inner wall centrally and longitudinally through an elongated square bar, forming in the inner surface of the cylindrical inner wall alternately and axially a plurality of guide grooves for loaded balls and guide grooves for non-loaded balls, said grooves having a U-shaped groove wall in transverse cross-section, forming a circular groove, for changing the rolling direction of balls, at each end portion of each of the grooves for loaded balls and its corresponding groove for non-loaded balls to define a ridge between each of the said grooves for loaded balls and its corresponding groove for non-loaded balls, said circular groove having a depth somewhat deeper than that of each of the guide grooves, and then splitting said bar into halves along diametrically-opposing guide grooves for non-loaded balls; a half-split ball retainer which has been formed by forming an endless raceway groove extending over each of the guide grooves for loaded balls and its corresponding guide groove for non-loaded balls, a long slit through said raceway groove in alignment with each of the guide grooves for loaded balls and a ridge in registration with each of the ridges of the case, said ball retainer being fit within the said case and a number of balls being filled between said case and ball retainer to form a half-split endless sliding ball bearing; a track shaft on which shoulders are axially formed in registration with a plurality of grooves defined by the loaded balls of said half-split endless sliding ball bearing, said track shaft being assembled with said half-split endless sliding ball bearing in such a manner that the line connecting a first point of contact between a loaded balls and said track shaft and a second point of contact between the same loaded ball and said case meets at a first acute angle with a line extending between said diametrically-opposing guide grooves for non-loaded balls as well as the line connecting a third point of contact between another loaded ball and said track shaft and a fourth point of contact between the same loaded ball and said case meets at a second acute angle with a line extending perpendicularly to the former line and passing through the center of the inner wall of the case.

2. A linear ball bearing unit according to claim 1, wherein each of said first and second acute angles is approximately 30°.

3. A linear ball bearing unit according to claim 1, wherein said half-split ball retainer is in contact with a pair of retainer holders fixedly secured to said half-split bearing case.

4. A linear ball bearing unit according to claim 3, wherein said half-split ball retainer is not in contact with said track shaft.

5. A method for manufacturing a linear ball bearing unit, said method comprising the following steps:
  (a) a first step of forming a cylindrical inner wall axially and centrally through an elongated square bar;
  (b) a second step of forming alternately and axially in the surface of said cylindrical inner wall a plurality of guide grooves for loaded balls and a plurality of guide grooves for non-loaded balls, both grooves having approximately U-shaped groove walls and being formed on a same circle, and said guide grooves for loaded balls having a width slightly greater than said guide grooves for non-loaded balls;
  (c) a third step of forming at each end portion of said bar a circular groove which has a depth somewhat deeper than that of each of the guide grooves and connects each guide groove for loaded balls and its corresponding guide groove for non-loaded balls, thereby forming a ridge between said each guide groove for loaded balls and its corresponding guide groove for non-loaded balls;
(d) a fourth step of splitting said bar along the diametrically-opposing guide grooves for non-loaded balls to form two half-split bearing cases having an inner wall of a semi-circle in cross-section;
(e) a fifth step of forming in a steel pipe a plurality of endless raceway grooves upon assembling with one of said half-split bearing cases, in alignment with said guide grooves for loaded and non-loaded balls of one of said half-split bearing cases, a long slit through said steel pipe at a location in registration with each of said guide grooves for loaded balls and a ridge between grooves for guiding non-loaded balls;
(f) a sixth step of forming two half-split ball retainers by splitting the thus-formed steel pipe along the diametrically-opposing guide grooves for non-loaded balls; and
(g) a seventh step of fitting one of said half-split ball retainer in one of said half-split bearing cases, filling the grooves of said one of said half-split ball retainers and said one of said half-split bearing cases with a number of balls to form an endless sliding ball bearing, and assembling a track shaft having a plurality of axially extending shoulders with said endless sliding ball bearing in such a manner that said shoulders fit in grooves defined by loaded balls and said one of said half-split ball retainers.

6. A method for manufacturing a linear ball bearing unit, said method comprising the following steps:
(a) a first step of forming a cylindrical inner wall axially and centrally through an elongated square bar;
(b) a second step of forming alternately and axially in the surface of said cylindrical inner wall a plurality of guide grooves for loaded balls and a plurality of guide grooves for non-loaded balls, both grooves having approximately U-shaped groove walls and being formed on a same circle, and said guide grooves for loaded balls having a width slightly greater than said guide grooves for non-loaded balls;
(c) a third step of forming at each end portion of said bar a circular groove which has a depth somewhat deeper than that of each of the guide grooves and connects each guide groove for loaded balls and its corresponding guide groove for non-loaded balls, thereby forming a ridge between said each guide groove for loaded balls and its corresponding guide groove for non-loaded balls;
(d) a fourth step of splitting said bar along the diametrically-opposing guide grooves for non-loaded balls to form two half-split bearing cases having an inner wall of a semi-circle in cross-section;
(e) a fifth step of forming a plastic-made half-split ball retainer which has a plurality of endless raceway grooves, upon assembling with one of said half-split bearing cases, in alignment with said guide grooves for loaded and non-loaded balls of said one of said half-split bearing cases, a long slit through said retainer at a location in registration with each of said guide grooves for loaded balls and a ridge between grooves for guiding non-loaded balls;
(f) a sixth step of fitting said plastic-made half-split ball retainer in one of said half-split bearing cases, filling the grooves of said ball retainer and said one of said half-split bearing cases with a number of balls to form an endless sliding ball bearing, and assembling a track shaft having a plurality of axially extending shoulders with said endless sliding ball bearing in such a manner that said shoulders fit in grooves defined by loaded balls and said ball retainer.

* * * * *